US008976542B2

(12) United States Patent
Richardson et al.

(10) Patent No.: US 8,976,542 B2
(45) Date of Patent: Mar. 10, 2015

(54) HIGH FREQUENCY CATHODE HEATER SUPPLY FOR A MICROWAVE SOURCE

(75) Inventors: Robert Richardson, Chelmsford (GB); Michael Bland, Welwyn (GB); Colin Bennett, Mickleover (GB)

(73) Assignee: E2V Technologies (UK) Limited, Chelmsford (GB)

( * ) Notice: Subject to any disclaimer, the term of this patent is extended or adjusted under 35 U.S.C. 154(b) by 187 days.

(21) Appl. No.: 13/509,191

(22) PCT Filed: Nov. 11, 2010

(86) PCT No.: PCT/GB2010/051881
§ 371 (c)(1),
(2), (4) Date: Jul. 26, 2012

(87) PCT Pub. No.: WO2011/058361
PCT Pub. Date: May 19, 2011

(65) Prior Publication Data

US 2012/0280619 A1 Nov. 8, 2012

(30) Foreign Application Priority Data

Nov. 11, 2009 (GB) .................................. 0919718.7

(51) Int. Cl.
*H01J 23/34* (2006.01)
*H02M 3/335* (2006.01)
(Continued)

(52) U.S. Cl.
CPC ................. *H01J 1/135* (2013.01); *H01J 23/05* (2013.01); *H01J 25/52* (2013.01); *H01J 25/587* (2013.01)
USPC ............ 363/16; 315/116; 363/79; 363/21.12; 219/715

(58) Field of Classification Search
CPC ............................... H02M 3/335; H05B 41/36
USPC .............. 315/291, 86, 371, 309, 116; 372/25; 363/21.12, 26
See application file for complete search history.

(56) References Cited

U.S. PATENT DOCUMENTS 4,967,051 A 10/1990 Maehara et al.
5,001,318 A * 3/1991 Noda ............................ 219/716
(Continued)

FOREIGN PATENT DOCUMENTS

CN 101317499 A 12/2008
EP 0301805 A1 2/1989
(Continued)

OTHER PUBLICATIONS

Author:A.P Godse, Title Date: Basics of Electronics Engineering, Publisher:Dec. 2008.*
(Continued)

*Primary Examiner* — Douglas W Owens
*Assistant Examiner* — Wei Chan
(74) *Attorney, Agent, or Firm* — Venable LLP; Robert Kinberg

(57) ABSTRACT

A high frequency cathode heater supply for a microwave source includes a SMPS inverter and an isolation transformer having a primary winding arranged to be powered by the SMPS inverter, a monitor winding passing through primary core assemblies of the primary winding and a secondary winding arranged for connection to the cathode heater. A current monitor is arranged to monitor a current in the primary windings. Signal processing modules are arranged to receive a first input signal from the monitor winding indicative of a voltage across the cathode heater and a second input signal from the current monitor indicative of a current through the cathode heater. The signal processing modules are arranged to output a control signal to the SMPS inverter to control power supplied to the cathode heater dependent on a monitored resistance of, or monitored power supplied to, the cathode heater as determined from the first input signal and the second input signal.

14 Claims, 11 Drawing Sheets

(51) Int. Cl.

| | |
|---|---|
| ***H05B 6/66*** | (2006.01) |
| ***H01J 1/13*** | (2006.01) |
| ***H01J 23/05*** | (2006.01) |
| ***H01J 25/52*** | (2006.01) |
| ***H01J 25/587*** | (2006.01) |

(56) References Cited

U.S. PATENT DOCUMENTS

| | | | | |
|---|---|---|---|---|
| 5,122,946 | A * | 6/1992 | Taylor | 363/21.16 |
| 5,206,870 | A * | 4/1993 | Rorden | 372/25 |
| 6,987,363 | B1 * | 1/2006 | Goral | 315/86 |
| 2002/0067626 | A1 * | 6/2002 | Koike et al. | 363/21.12 |
| 2008/0192515 | A1 * | 8/2008 | Huynh et al. | 363/21.12 |
| 2008/0198638 | A1 * | 8/2008 | Reinberger et al. | 363/74 |
| 2009/0091957 | A1 * | 4/2009 | Orr et al. | 363/79 |
| 2010/0109571 | A1 * | 5/2010 | Nishino et al. | 315/307 |
| 2010/0244726 | A1 * | 9/2010 | Melanson | 315/291 |

FOREIGN PATENT DOCUMENTS

| | | | |
|---|---|---|---|
| GB | 2227134 | A | 7/1990 |
| JP | 63281391 | A | 11/1988 |
| JP | 4-32520 | U | 3/1992 |
| JP | 4-85691 | U | 7/1992 |
| JP | 2003297545 | A | 10/2003 |
| JP | 2005228596 | A | 8/2005 |
| JP | 2006114419 | A | 4/2006 |

OTHER PUBLICATIONS

International Search Report of PCT/GB2010/051881 Dated Feb. 2, 2011.

Chinese Office Action issued in Application No. 201080051321.4 issued Apr. 23, 2014.

Notification of Reason for Rejection Dated Aug. 27, 2014, Issued by the Japanese Patent Office in Corresponding Application No. 2012-238411.

* cited by examiner

HIGH FREQUENCY CATHODE HEATER SUPPLY FOR A MICROWAVE SOURCE

CROSS-REFERENCE TO RELATED APPLICATIONS

This application is derived from international patent application PCT/GB2010/051881 and claims priority from UK Patent Application GB 0919718.7 filed Nov. 11, 2009.

FIELD OF THE INVENTION

This invention relates to a high frequency cathode heater supply for a microwave source.

BACKGROUND OF THE INVENTION

Radio frequency (RF) heating is used for a wide range of industrial processing applications such as metal melting, welding, wood drying and food preparation. The output powers required range from a few kilowatts to values in the megawatt region. The frequency range can be a few hundreds of kilohertz to several tens of megahertz using triodes or tetrodes. For microwave applications of RF in the frequency range above 500 MHz it is usual, but not necessary, to use magnetrons.

Thermionic tubes require a heater supply to heat the thermionic cathode and in high power thermionic tubes the cathode is heated directly, i.e. the heater acts as the cathode. The use of the term “cathode”, “cathode heater” or “heater” throughout this document implies this definition where the context does not demand otherwise. With thoriated tungsten or pure tungsten cathodes used in such tubes the heater power required is usually quite high, for example 12V at 120 A implying a relatively low load resistance of 0.1 ohm. Also practical and convenient embodiments of the microwave generator frequently require that the heater circuit is operated not at ground potential but at an eht potential of 20 kV or higher.

Thus, in such embodiments, the cathode supply has to provide several kW of power to a low resistance load with a voltage isolation >20 kV. It is well-known to provide this power with a large power frequency transformer operating at 50 Hz or 60 Hz and constructed with large spacing and typically immersed in oil to provide high voltage isolation. Generally the voltage applied to the cathode has to be carefully controlled and adjusted during operation and thyristor regulators are used for this function, typically operating on the primary of a mains transformer.

It is important that the cathode, being one of the most fragile components of a magnetron, operates at its design temperature to prolong the life of the cathode by avoiding overheating while maintaining the required emissivity and preventing arcing by avoiding under heating. It is known in the art to seek to monitor the cathode temperature with a pyrometer, but with use of the magnetron the pyrometer window becomes occluded leading to false temperature readings. Alternatively, a varying schedule of power supplied, developed on a trial and error basis, may be applied during warm-up and operation of the magnetron.

Moreover, known transformers for supplying the heater current are expensive and very large, occupying a volume of 0.07 $m^3$ and weighing 100 kg in the example given above. Moreover, thyristor controllers for power regulation are problematic in that they have limited control capabilities and poor transient response characteristics.

It is an object of the present invention at least to ameliorate the aforesaid disadvantages in the prior art.

SUMMARY OF THE INVENTION

According to the invention there is provided a cathode heater supply for a microwave source comprising: switched mode power supply (SMPS) inverter means; isolation transformer means comprising: a primary winding arranged to be powered by the SMPS inverter means, a monitor winding passing through primary core assemblies of the primary winding and a secondary winding arranged for connection to the cathode heater; current monitor means arranged to monitor a current in the primary windings; and signal processing means arranged to receive a first input signal from the monitor winding indicative of a voltage across the cathode heater and a second input signal from the current monitor means indicative of a current through the cathode heater, the signal processing means being arranged to output a control signal to the SMPS inverter means to control power supplied to the cathode heater dependent on a monitored resistance of, or monitored power supplied to, the cathode heater as determined by the signal processing means from the first input signal and the second input signal.

Conveniently, the monitor winding is a single turn winding.

Conveniently, the primary winding is a single layer winding.

Advantageously, the signal processing means comprises: monitor and control means arranged to receive the first input signal from the monitor winding and the second input signal from the current monitor means and to output a comparison signal comprising a division or product of the first input signal and the second input signal; and error amplifier means arranged to receive the comparison signal from the monitor and control means and a reference signal from reference voltage means and to output a control signal to the SMPS inverter means dependent on a comparison of the comparison signal and the reference signal to control power supplied by the SMPS inverter means to the cathode heater.

Conveniently, power supplied to the cathode heater by the SMPS inverter means is controlled by controlling a duty cycle of the SMPS inverter means.

Advantageously, the cathode heater supply comprises capacitor means connected in series between the SMPS inverter means and the primary winding.

Conveniently, the cathode heater supply is for supplying AC power to the cathode heater, wherein the capacitor means is such that the primary circuit supplying the primary windings is a resonant circuit resulting in a quasi-sine primary current waveform with a detectable stationary point.

Advantageously, the secondary winding is a single turn winding.

Conveniently, the monitor and control means comprises:

differentiator means connected to the current monitor means and arranged to determine a stationary point of a waveform of the primary current;

first full wave rectifier means having an input connected to the current monitor means and an output to first sample and hold means having an enable input from the differentiator means to sample the primary current at the stationary point;

second full wave rectifier means having an input connected to the monitor winding and an output to second sample and hold means having an enable input from the differentiator means to sample a primary voltage at the stationary point; and a multiplier/divider module arranged to receive and process signals from the first sample and hold means and the second sample and hold means and to output a control signal to the SMPS inverter means.

Conveniently, the cathode heater supply is for supplying DC power to the cathode heater, and further comprises synchronous rectifier means and inductance means arranged to be connected in series between the secondary winding and the cathode heater to be heated, wherein the secondary winding comprises two single turn windings arranged for current to flow alternately therein.

Advantageously, the inductance means comprises inductive cores encircling connection leads arranged for connecting the secondary winding to the cathode heater to be heated.

Conviently, the signal processing means comprises:

first full wave rectifier means having inputs connected to outputs of the current monitor means;

second full wave rectifier means having inputs connected to outputs of the monitor winding;

first integrator means having a input connected to a first output of the first full wave rectifier means;

second integrator means having respective inputs connected to a first and second outputs of the second full wave rectifier means; and a multiplier/divider module having four respective inputs connected to an output of the first integrator means, a second output of the first full wave rectifier means and first and second outputs of the second integrator means respectively and an output connected to error amplifier means.

Advantageously, the signal processing means is digital signal processing means.

BRIEF DESCRIPTION OF THE DRAWINGS

The invention will now be described, by way of example, with reference to the accompanying drawings in which.

In the Figures, like reference numbers denote like parts.

DETAILED DESCRIPTION OF EMBODIMENTS

AC Cathode Heating Supply

Figure 1:
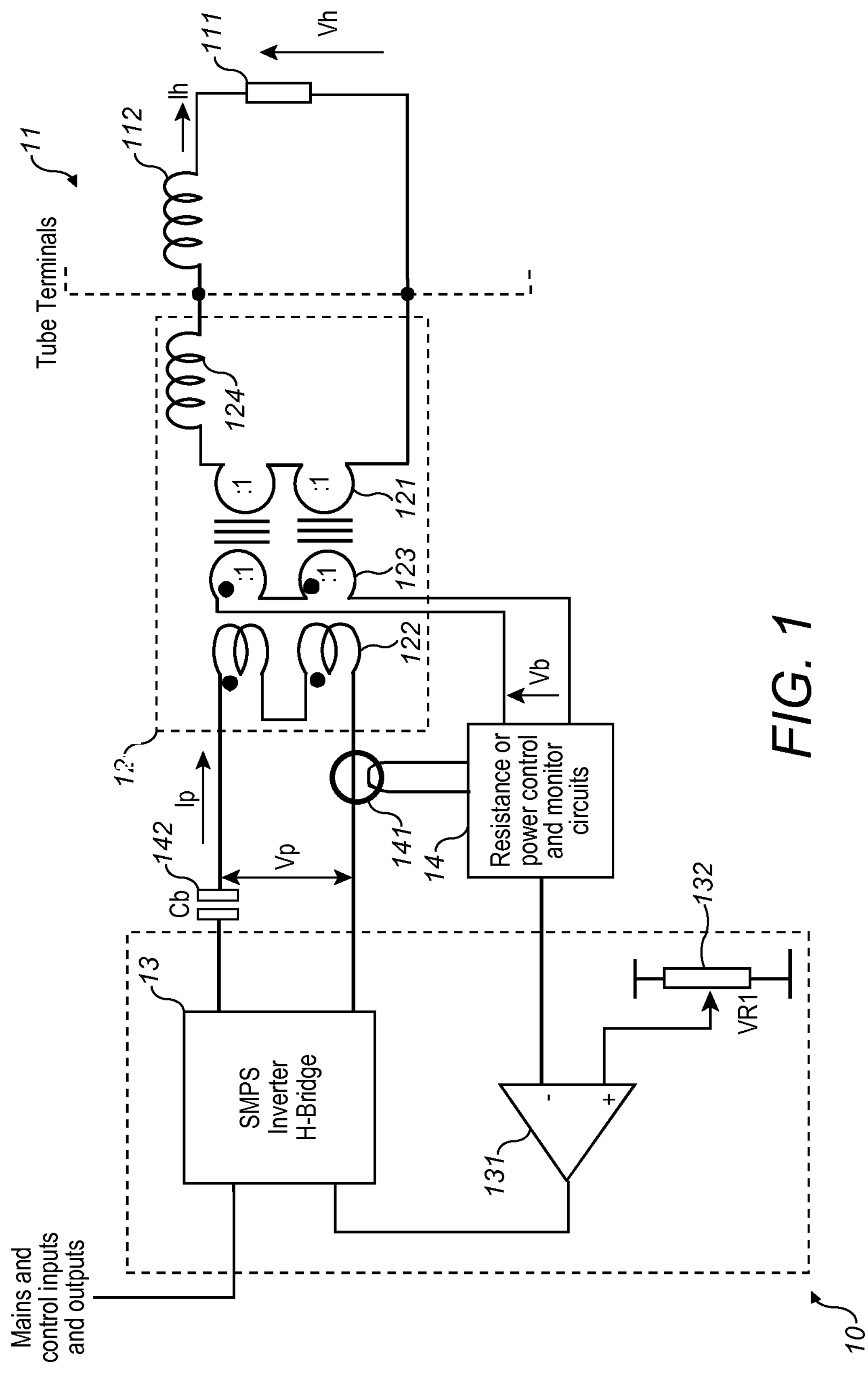
FIG. 1 is a circuit diagram of an embodiment of an AC heater supply according to the invention.
Figure 2:
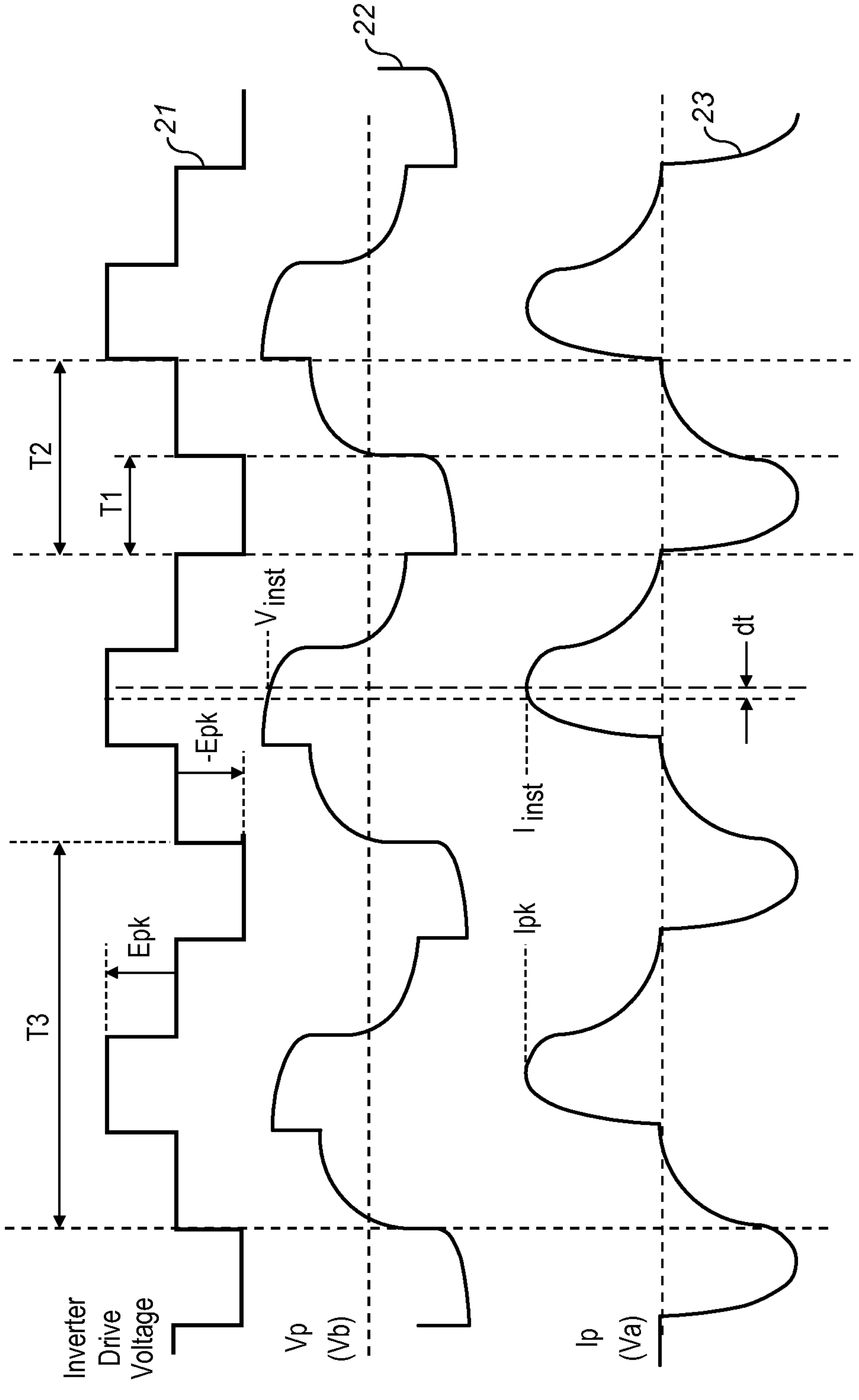
FIG. 2 illustrates waveforms generated by the circuit of FIG. 1.

A basic circuit diagram of an AC cathode heating supply according to the invention is shown in FIG. 1 and corresponding waveforms are shown in FIG. 2.

Referring to FIG. 1, the AC cathode heating supply 10 for heating an electronic tube heater 11 comprises an isolation transformer 12 the secondary windings 121 of which are electrically connected to the heater and the N primary windings 122 of which are electrically connected to and powered by a Switched Mode Power Supply (SMPS) inverter H-bridge 13, so that the ratio of the transformer from the primary is N:1 step down. The isolation transformer 12 also comprises a single turn monitor winding 123 which passes through each core assembly of the primary windings 122. The monitor winding is electrically connected to a first input of a module 14 of resistance or power monitor and control circuits. A current monitor 141 arranged to monitor an electrical current in the primary windings is electrically connected to a second input of module 14. An output of the module 14 is electrically connected to one input of an error amplifier or comparator 131, a second input to the error amplifier is provided by a variable reference voltage module 132. An output of the error amplifier is electrically connected to a control input of the SMPS inverter H-bridge 13. A power input of the SMPS inverter H-bridge 13 is connected to mains control inputs and outputs. A capacitor 142 is connected in series between one of two outputs of the SMPS inverter H-bridge 13 and the primary windings 122.

When operating at higher frequencies a voltage at terminals of the magnetron comprising the cathode heater 11 may not be a same voltage Vh as presented to the cathode resistance (Rh) 111 of the cathode heater 11. This is because of inevitable inductance 112 of the tube heater connections and of the heater itself which may well provide a significant tube inductance (Lt). As an example, a known magnetron BM75L available from e2v technologies plc, Chelmsford, UK has a cold resistance of around 10 mohms and a hot working resistance of around 100 mohms. The cathode assembly inductance is of the order of 0.5 μH. At normal 50/60 Hz values the reactance of this inductance is only around 0.16 mohm but at, for example, 15 kHz the inductance is 47 mohms; almost half that of the required hot working resistance.

Further additional problems arise in that an interconnection inductance and transformer (Tfmr1) leakage inductance 124, shown in FIG. 1 as circuit stray inductance (Ls), can easily approach 1 μH thus adding to the problem caused by the tube inductance (Lt) 112.

Electrical resistance (Rh) 111 of the cathode heater 11 may also vary due to skin or proximity effects that occur at higher frequencies in conductors. However, the relatively poor electrical conductivity of the materials used for typical tube cathodes, such as tungsten, and their high operating temperature >1800° C., generally result in minimal resistance variation of the cathode due to frequency-related effects over the frequency range of interest.

During warm up of the cathode the inverter 13 provides power to heat the cathode 11. Once in operation with full anode input power to the tube (that may be several hundreds of kilowatts), however, circuit operation may result in further power being fed to, or removed from, the cathode resulting in a change in temperature of the cathode heater. As emission and cathode life are sensitive to temperature it is very desirable to keep the cathode temperature at its specified optimum value.

As the cathode 11 is made from a material with a significant temperature coefficient of resistance it is possible to use resistance change of the cathode to monitor changes in cathode temperature.

In the case of a magnetron, back bombardment power when anode current starts to flow can contribute approximately 70% of the required heating power to the cathode and if no adjustment is made the cathode would overheat. By sensing electrical resistance of the cathode, the input power from the main power source can be reduced to compensate for this additional heating and thus if adjustments are made to the power supplied to keep the temperature constant, then a measured resistance of the cathode will be constant.

It is found using resistance control, that the optimum resistance is dependent on the anode input power to the device. That is, the required resistance, and thus the cathode temperature, vary with anode power. However, the resistance can be set to any required value to optimise the performance of the system.

Thus there is not necessarily a single optimum temperature, and thus a single optimum emission current. For some aspects of performance the cathode temperature may be varied to suite a particular operating scenario.

The temperature relates to the resistance and the resistance control may thus not be set to a fixed value but a pre-programmed series of values. So, for example, if a user requires high power a higher resistance may be set implying a higher temperature thus more emission. Conversely if a user wants an extended run at low power, a lower resistance, and thus temperature and emission may be appropriate.

A digital implementation permits a wide variety of options to be readily programmed into the control system.

If the electronic tube is of a type that does not have a cathode the power input of which is affected by the anode input power, then satisfactory control can be implemented by applying constant power to the tube cathode 11 via the inverter 13.

A drive voltage waveform 21 of the Switched Mode Power Supply (SMPS) inverter 13 is shown in FIG. 2. It is convenient to generate a voltage waveform 22 that provides peak output primary voltage Vp of the form shown in FIG. 2 with a corresponding primary current Ip. This waveform is of a well-understood form providing an output cycling through +Edk, zero and −Edk and the output impedance must be low in any of these states when either sinking or sourcing current. Usually the inverter will operate from a rectified 3 phase mains supply so the voltage |Edc| will be of the order of 560V. As indicated above, the inverter 13 incorporates an error amplifier 131, one input of which is connected to a reference voltage supply 132 via a control VR1. The reference voltage supply 132 can be used to set an output power or the resistance setting of the load. Power or resistance control is effected by using the error amplifier 131 to compare a signal proportional to power or resistance of the load with the know reference 132. The output of the error amplifier provides a signal that allows a duty cycle, a ratio of T1/T2 as shown in FIG. 2, to be varied to maintain the power or the resistance at a set value in a known manner.

A capacitance Cb of the DC blocking capacitor 142 is selected to produce a resonant circuit such that the resonant frequency $\omega_o$ of the capacitance Cb and total inductance ($Ls+N^2Lt$) is approximately $2\pi F/1.15$ where F is the operating frequency of the SMPS 13. This results in the primary current Ip being of rounded, quasi-sine form so that it is relatively easy to detect and sample the peak value Ipk of the current Ip where the rate of change of current is zero, i.e. dIp/dt=0, that is a stationary point in the waveform.

When dIp/dt=0 the induced voltage in the inductors Ls and Lt will be zero and so at this time the voltage Vp seen at the transformer primary will be the voltage Vh across the load multiplied by the transformer ratio $N^2$.

In the invention the sensing of the signals to provide the power or resistance feedback is implemented on the primary side of the isolation transformer (Tfmr1) 12. This requires a transformer with very low losses and reasonably well-controlled residual values. Using the method of the present invention, complex monitoring circuits are not required at the secondary side of the transformer.

By monitoring the primary signals of voltage and current a feedback signal proportional to power or resistance can be obtained.

As also shown in FIG. 1, a known current monitor 141 in the form of a current transformer arranged around the primary feed from the inverter H-bridge 13 monitors the primary current Ip. Because the isolation transformer (Tfmr1) 12 is designed to have very low loss and a high value of shunt inductance, the current Ip is a faithful reproduction of heater current Ih, but scaled down in amplitude by ratio N of the isolation transformer (Tfmr1) 12. The output from this monitor 141 forms the basis of a current monitoring signal Va.

A voltage monitoring signal Vb is obtained by a single turn pickup winding 123 close to the primary winding 122 of the transformer (Tfmr1) 12. If the monitor winding 123 is close to the primary cores and if it is lightly loaded ($Rload>500*N^2*Rb$) the monitor winding will give a faithful representation of the voltage Vp applied to the transformer. The applied voltage Vp will be stepped down by the transformer ratio N to provide the voltage monitoring signal Vb for a power or resistance calculation.

With the availability of the monitoring signals Vb and Va and because of the low loss in the isolation transformer (Tfmr1) 12 the resistance of the heater can be calculated by taking the ratio of Vb/Va with a divider circuit for use by the inverter module 13 in order to regulate the power applied to the cathode heater to maintain the resistance, and thus the temperature, constant.

To determine power applied to the cathode heater a multiplier is required to calculate the product Va*Vb to determine Ip*Vp and hence Ih*Vh while to determine resistance of the heater a division function is required to calculate Vb/Va to determine Vp/Ip and hence Vh/Ih.

DC Cathode Heating Supply

Figure 4:
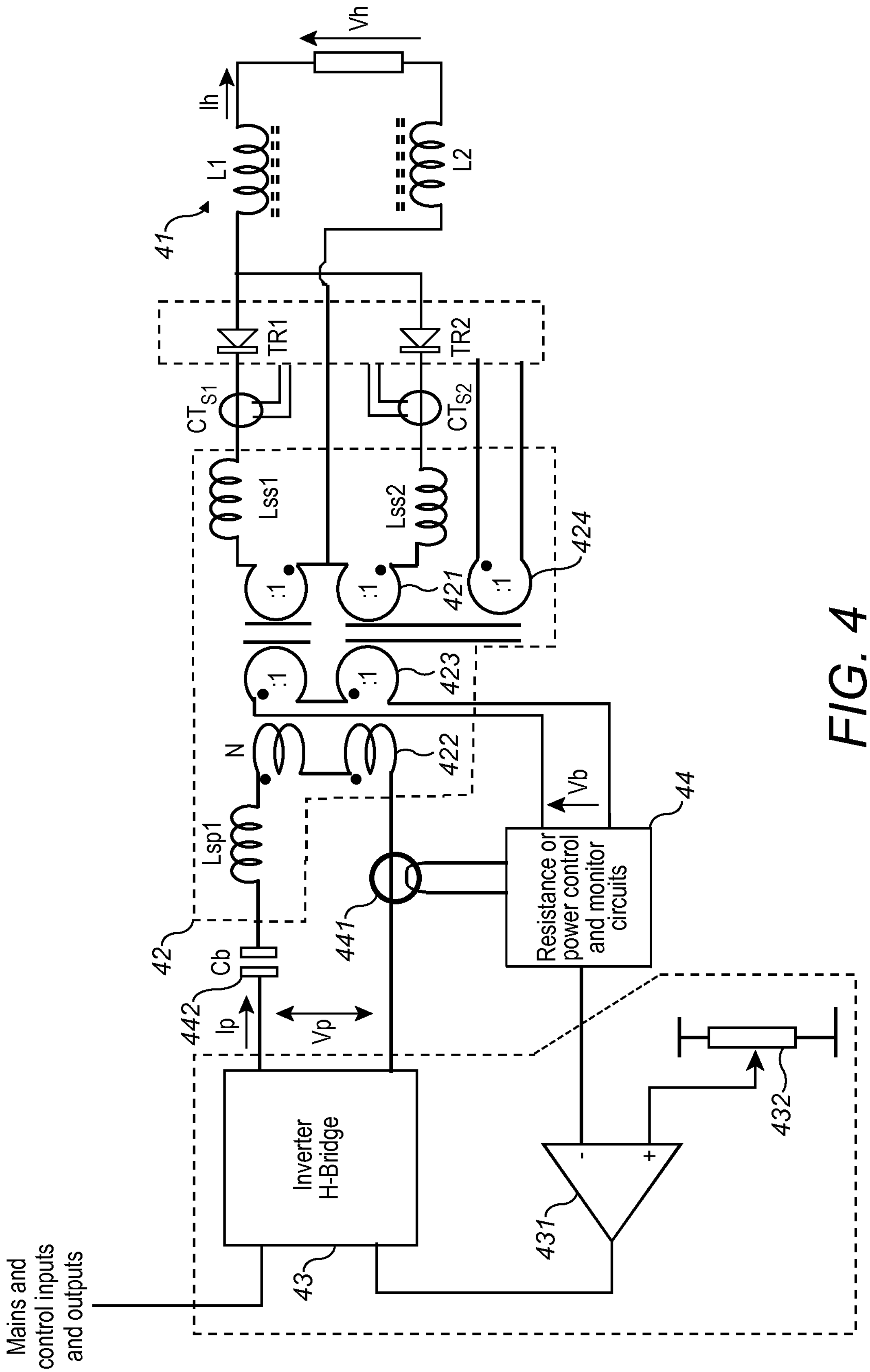
FIG. 4 is a circuit diagram of an embodiment of a DC heater supply according to the invention.
Figure 5:
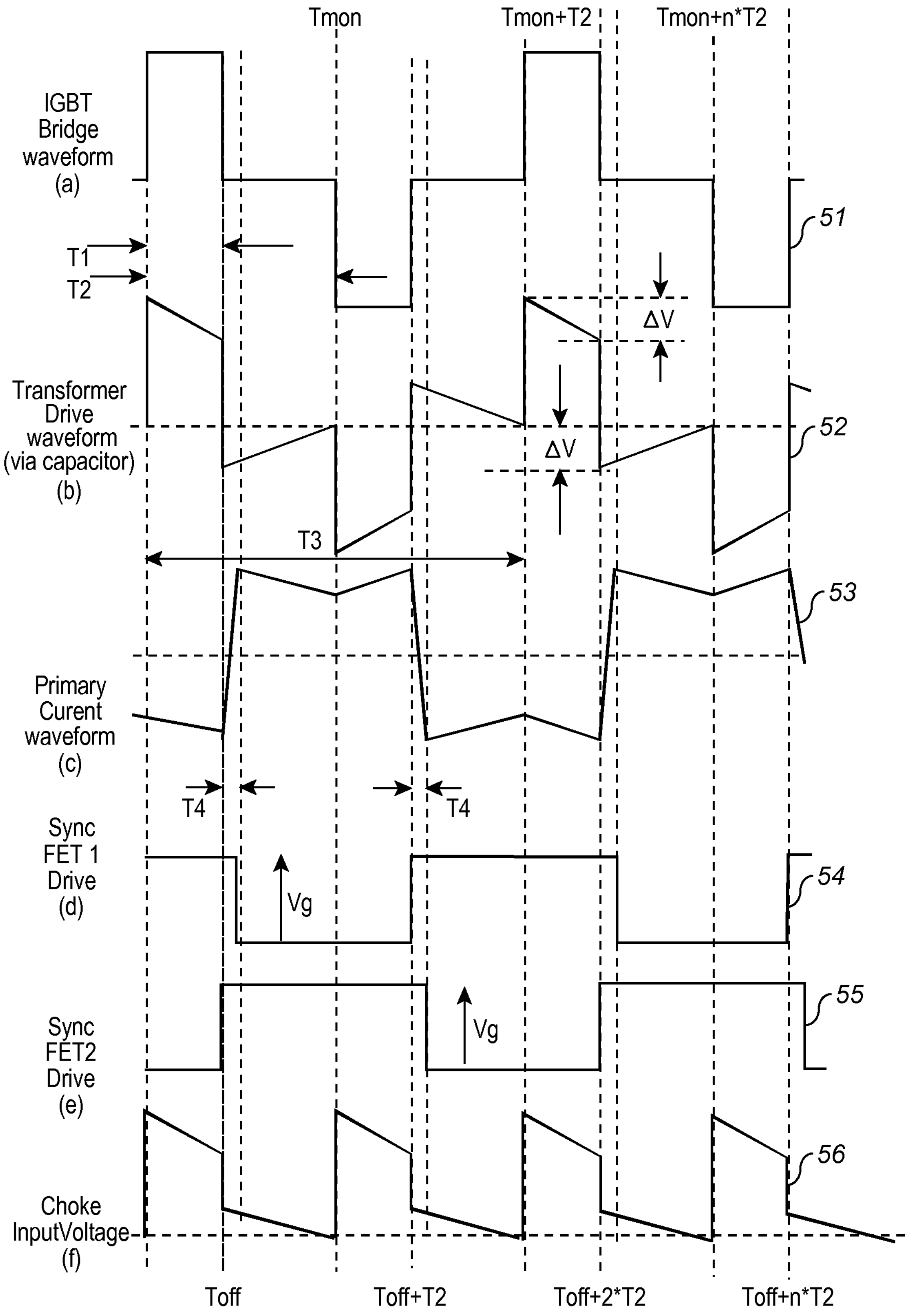
FIG. 5 illustrates waveforms generated by the circuit of FIG. 4.

The basic arrangement of a DC cathode heating supply system is shown in FIG. 4 with corresponding waveforms illustrated in FIG. 5.

Referring to FIG. 4, the DC cathode heating supply 40 for heating an electronic tube heater 41 comprises isolation transformer 42 the secondary windings 421 of which are electrically connected via synchronised rectifiers TR1 and TR2 to the cathode heater 41 and the primary windings 422 of which are electrically connected to and powered by a Switched Mode Power Supply (SMPS) inverter H-bridge 43. The isolation transformer 42 also comprises a monitor winding 423 which passes through each core assembly of the primary windings 422. The monitor winding is electrically connected to a first input of a module 44 of resistance or power control and monitor circuits. A current monitor 441 arranged to monitor an electrical current in the primary windings 422 is electrically connected to a second input of module 44. An output of the module 44 is electrically connected to one input of an error amplifier or comparator 431, a second input of the error amplifier is provided by a variable reference voltage module 432. An output of the error amplifier is electrically connected to a control input of the SMPS inverter H-bridge 43. A power input of the SMPS inverter H-bridge 43 is connected to mains control inputs and outputs. A capacitor 442 is connected in series between one of two outputs of the SMPS inverter H-bridge 43 and the primary windings 422.

Full wave push pull synchronised rectifiers TR1 and TR2 with chokes L1 and L2 input filtering are used to provide a DC output from the secondary windings 421. The behaviour of the transformer (Tfmr1) 42 is now importantly different from the transformer 12 used in the previously described AC heater supply. Transformer leakage inductances (Lss1 and Lss2) have currents with DC components in them while only the primary leakage inductance (Lsp1) has an AC component of current flowing therein.

It is unavoidable that the secondary leakage inductances (Lss1 and Lss2) are closely coupled due to the proximity of the secondary windings 421, and relatively large because of the needs of high voltage isolation. Suitable construction methods are described herein in a description of transformer construction and design.

The addition of the rectifiers TR1 and TR2 could, if avoiding steps were not taken, introduce significant loss. With a supply of 12V at 120 A for the known BM75L magnetron from e2v technologies plc, for example, a drop of up to 1V or more in the diodes TR1 and TR2 would represent a significant loss of power and render power or resistance measurement at the transformer primary winding 422 less effective.

To overcome the rectifier loss problem, synchronous rectification with MOSFETs is used. This implementation optimises the drive to the FETs to take into account the unusually high leakage inductances in the secondary side of the isolation transformer (Tfmr1) 42.

Referring to FIG. 5, the inverter waveform 51 is shown in (a). The transformer drive waveform 52 via the blocking capacitor Cb 142 is shown as (b). The droop ΔV on the drive is produced by the impedance which the capacitor Cb presents at each inverter pulse off commutation. The voltage on the capacitor Cb at the time Toff+n*T2/2 (where n has any integer values including zero) is designed to ensure rectifier commutation takes place desirably quickly. During a time T4 the current will fall in one rectifier while it rises in the other, because of the leakage inductances and the coupling between them. Thus both rectifiers TR1 and TR2 conduct for the period T4 so that each rectifier must be triggered on during the period T4. Thus an overlap in the conduction of the rectifier TR1 and TR2 is required. The overlap time T4 is determined by the value of the voltage droop ΔV on Cb and the inductance Lss1 and Lss2 and their degree of coupling. The resultant primary current waveform 53 is shown in (c) and the required drives 54, 55 for the synchronous rectifiers are shown in (d) and (e). The rectification action produces a voltage 56 at the choke input (f). The advantage of this circuit is that the energy in the leakage inductances Lss1 and Lss2 is recovered without loss thus making the power and or resistance monitoring at the primary more effective. By careful selection the capacitor Cb can desirably have a same value for either AC or DC applications so that a common heater inverter can be used for AC or DC applications.

Figure 7:
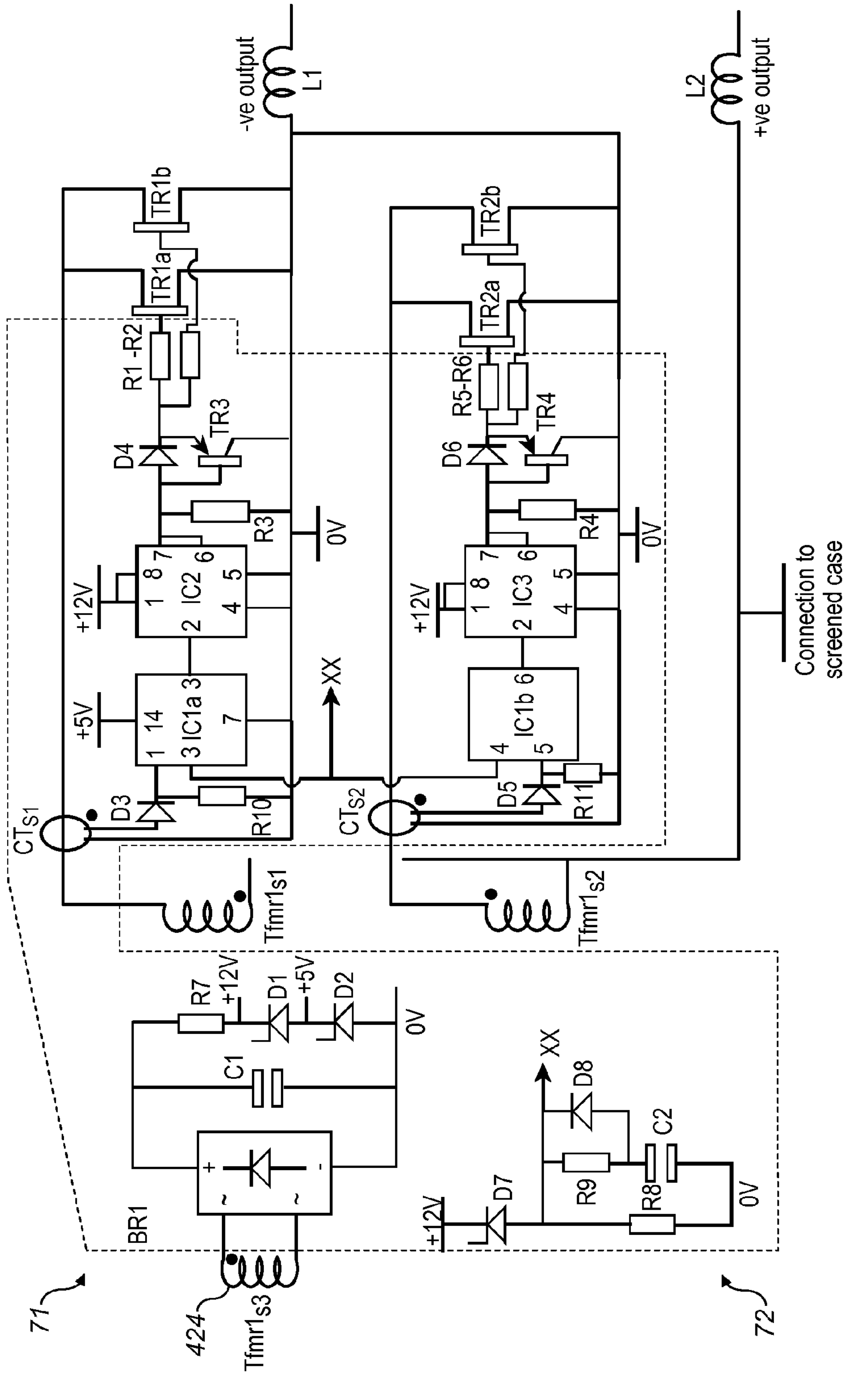
FIG. 7 is a circuit diagram of a suitable drive circuit for the synchronous rectifiers of FIG. 4.

A suitable drive circuit 71 for the synchronous rectifier TR1, TR2 is shown in FIG. 7. Referring also to FIG. 4, power to operate the drive circuit is provided by a further secondary winding ($Tfmr_{s3}$) 424. Referring again to FIG. 7, the further secondary winding 424 feeds a rectifier BR1 in parallel with a filter capacitor C1 and a regulator diode chain of a resistor R7 and two diodes D1 and D2 to power LT rails of +5V and +12V for the drive circuits. Synchronous rectifier FETs TR1*a* and TR1*b* and TR2*a* and TR2*b* are illustrated connected in parallel for each function but a single or multiple FETs may be used as dictated by requirements of the design output current. The pairs of synchronous rectifier FETs are driven by driver chips IC2 and IC3, such as MAX4422 that provide a gate drive to the FETs via D4, R1, R2 and D6, R5, R6. An AND gate IC1*a* and IC1*b* such as a 78HC08 controls the driver circuits and prevents a signal being applied to the driver chips IC2 and IC3 until the LT rails voltages are established. A delay circuit 72 as shown in FIGS. 7, of D7, D8, R8, R9, and C2 provides a requisite delay to permit the +12V and +5V rails to establish.

Current monitors $CT_{s1}$ and $CT_{s2}$ monitor a current to each synchronous rectifier TR1 and TR2. Rectifying burdens D3, R10 and D5, R11 are used on each current monitor so that the current monitors output signals to an AND Gate (IC1*a* or *b*) only when current is flowing in a given rectifier TR1 and TR2.

During start up, the synchronous rectifiers TR1 and TR2 are both subjected to rapid switching voltage rises across their drain sources. The additional circuits TR3, R3 and TR4, R4 in the gate prevent Miller capacitance currents in the FETs that may raise the gate voltage and result in undesirable turn-on of the synchronous rectifier TR1 and TR2 from occurring. Once the LT supply rails (+12V and +5V) are established, the output resistances of the driver chips IC2 and IC3 are adequate to prevent this spurious turn-on.

The circuit arrangement is such that while the LT is being established the circuit behaves as a normal rectifier with diode drops around 1V during conduction in TR1 and TR2. When the trigger circuit is enabled after LT is established the trigger waveform takes over and lowers the voltage drops in the synchronous rectifiers to around 25 mV or less.

Transformer Construction

AC Heating Supply

When operating any SMPS at higher frequencies, volts/turn of the transformer increase compared with operation at lower frequencies. Eventually by suitable design selection a low voltage winding may be reduced to a single turn and this characteristic is exploited in the design of a transformer for use in the invention.

Figure 8:
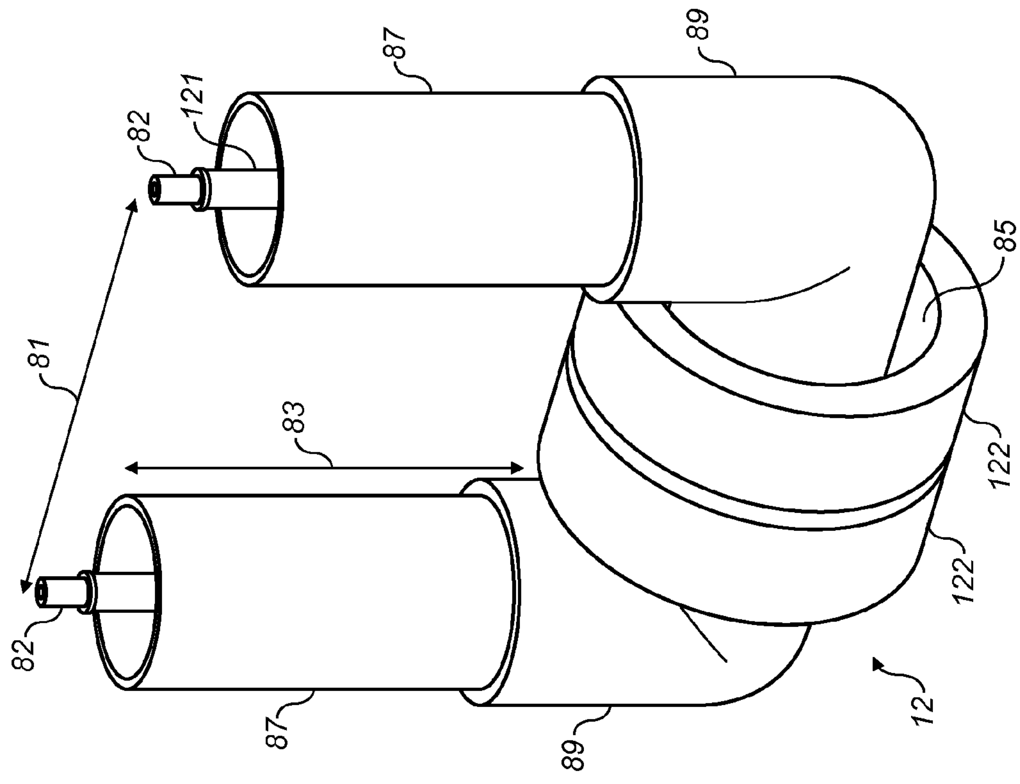
FIG. 8 is a perspective view of a transformer suitable for the AC heater supply of FIGS. 1 to 3.

A suitable isolation transformer (Tfmr1) 12 is shown in FIG. 8 and has a single turn secondary winding comprising a loop of copper tubing 121. At high frequencies due to skin and proximity effects any current tends to flow at a surface of a conductor with a circular cross-section. Thus a tubular conductor with a wall thickness of approximately the skin depth utilises the area of copper very effectively. At 15 kHz the skin depth is of the order of 0.5 mm so that standard central heating copper tubing of between 0.5 mm and 1 mm makes an ideal conductor for this application. Fabrication of the tube can use a standard soldered end feed fitment that would be used for central heating fittings or the tube can be preformed to the required U shape required.

Another key requirement is that the voltage hold-off between the secondary winding 121 and primary winding 122 in very high. However, it is also desirable that the transformer be compact. As an example for the BM75L magnetron available from e2v technologies plc, a working voltage of up to 25 kV is desirable. For high voltage design the use of a circular cross-section conductor is ideal as the electric stress for a given geometry decreases as the radius of the surface increases. Thus a circular cross-section single conductor constitutes an ideal form of winding for a system involving high voltage insulation requirements.

Figure 9:
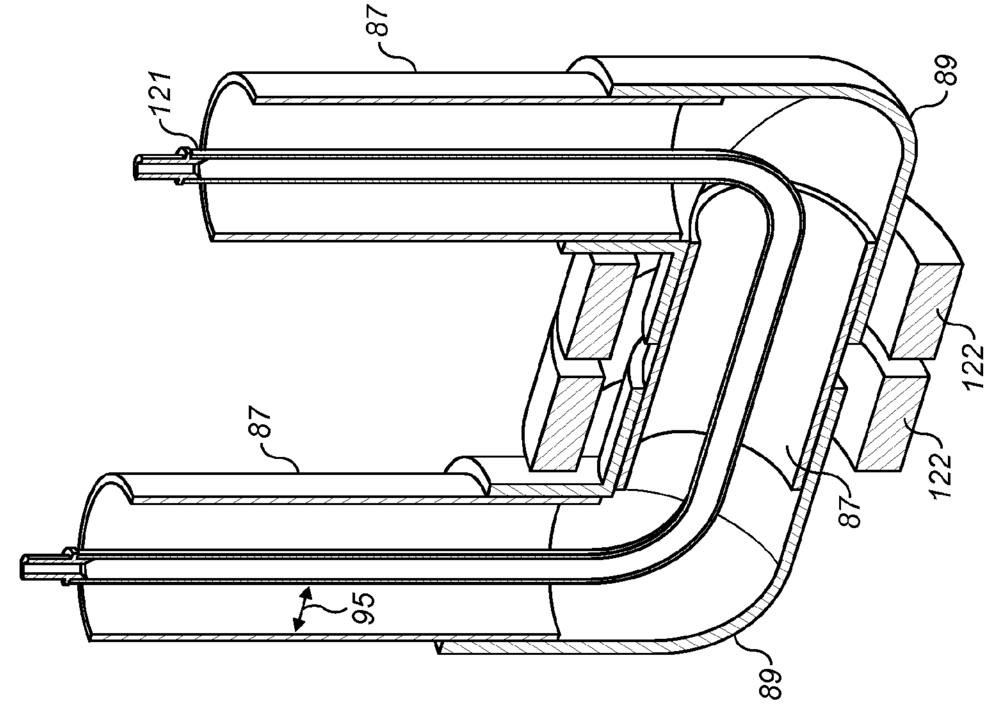
FIG. 9 is a vertical cross-section of the transformer of FIG. 8.

Referring to FIGS. 8 and 9, a single U-shaped tube, comprising two parallel leg portions joined at one end thereof by a bridging portion, constituting the secondary winding 121 is encapsulated in a suitable epoxy resin 95. Threaded inserts 82 for connection to the heater and cathode are brazed into the free ends of the U-shaped tube 121. A spacing 81 of free ends of the U-shaped tube 121 can be such as to connect directly to RF tube heater and cathode terminals. The resin 95 may be contained by a mould tool made up from standard plastic pipe fittings of the type used for waste water. Such pipe fittings are typically made from high temperature PVC which has most advantageous electrical insulating properties at high voltage. By suitable selection of straight pipe 87 and 90° elbows 89 a suitable mould can be built around the single tube 121. The primary cores with their windings 122 can be threaded over one of the leg portions to fit on the bridging portion of the U-shaped mould so formed. After moulding, the plastic pipe and elbows used for the tool can be left in place and form an additional part of the electrical insulation circuit.

Rather than use a single core, M narrow cores are used, where M=2 in the embodiment illustrated in FIGS. 1 and 8 to 13. These pass around the 90° elbows 89 more readily than would a single longer core and their primary windings 122 are then connected in series. They can be held in place by the use of, for example, hot melt adhesive 85.

Material sizes are chosen so that thickness of the epoxy 95 and a surface tracking distance 83 provide adequate electrical isolation for the required eht voltage. For example, where the isolation is 25 kV and the output is 12 V at 120 A, a 15 mm diameter, 1 mm thick copper tube may be used for the single turn 121 and 32 mm PVC water fitments for the mould tool 87 and 89. The resulting epoxy thickness is around 8 mm and the creep distance 83 is 120 mm.

A resultant size of the transformer together with the choice of operating frequency permits the use of amorphous cores for the M cores of the primary windings 122. The cores work at relatively low peak flux density and so the loss is very low. Furthermore the core windings 122 can be a single layer winding of suitably sized wire. For an example, with the BM75L, cores of magnetic area 162 $mm^2$ and magnetic length 225 mm prove a suitable choice. As can be seen the whole structure has components that have smooth and/or circular type perimeters. Single layer windings 122 and a circular cross-section secondary conductor 121 provide an AC resistance at 15 kHz close to the DC resistance, thus giving best possible utilisation of the copper. Such shapes also represent optimum methods of achieving the lowest electrical stress in a given volume of material. Consequently, for its power throughput and eht isolation, the transformer is very light and compact. For example, a transformer suitable for the e2v BM75L magnetron weighs only 1 kg and has a total loss of <15 W at full output.

FIG. 1 shows a single turn primary winding 123 used for monitoring purposes. This winding is wound through the M cores of the primary winding 122 after fitting the cores to the moulded assembly and before the final application of the hot melt glue 85 used to secure the cores.

DC Heating Supply Rectifier and Transformer Construction.

Figure 11:
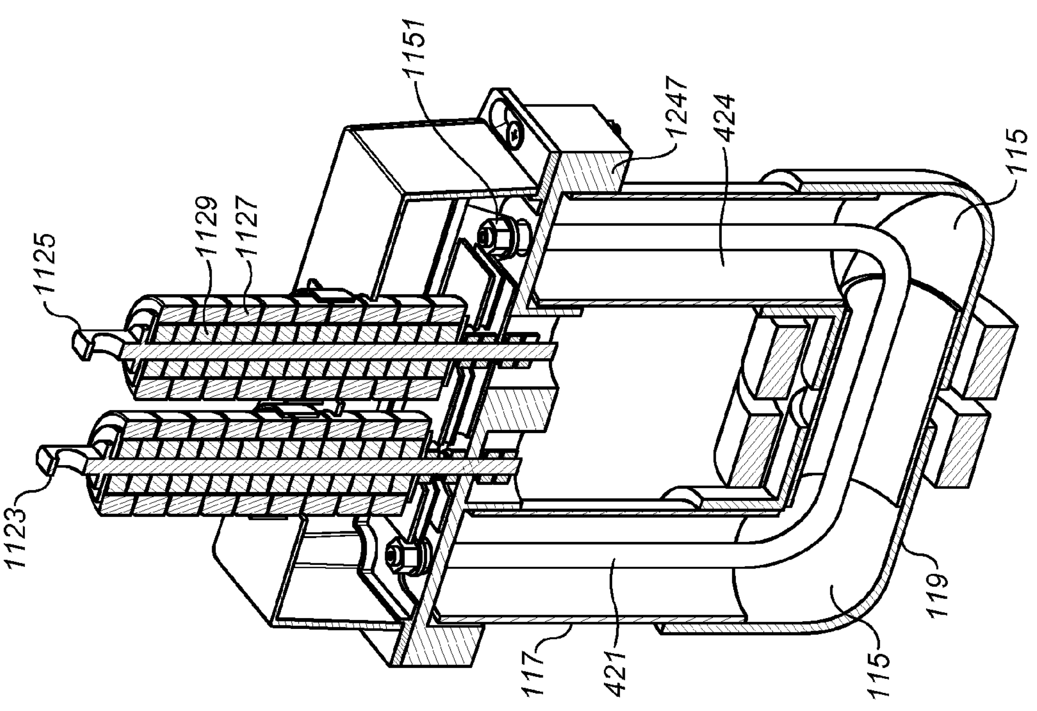
FIG. 11 is a vertical cross-section of the transformer of FIG. 10.
Figure 10:
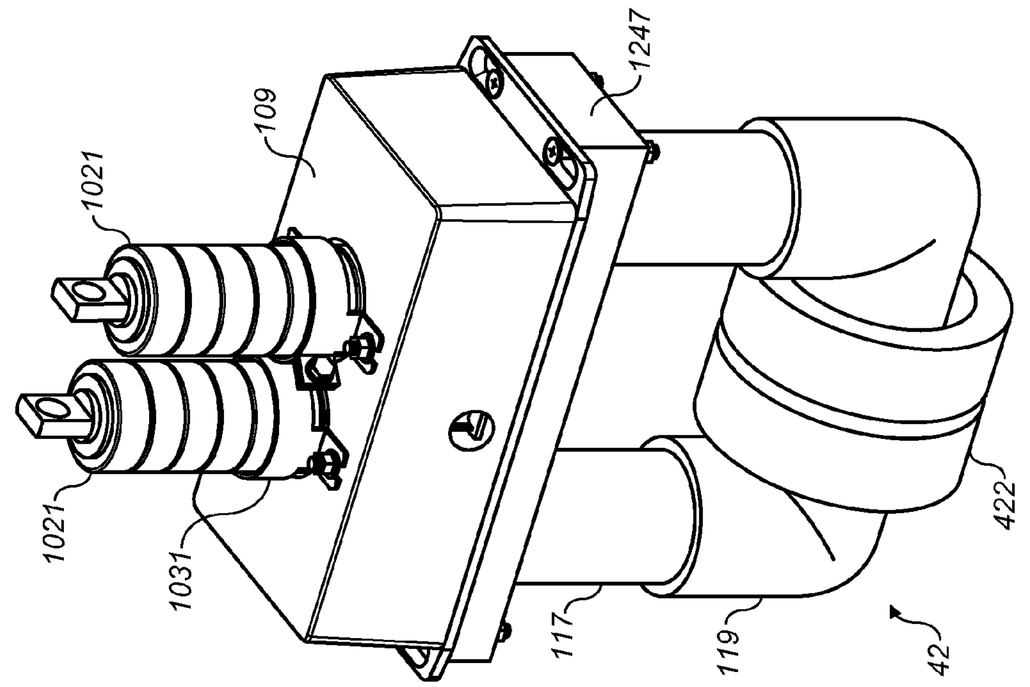
FIG. 10 is a perspective view of a transformer suitable for the DC heater supply of FIGS. 4 to 7.
Figure 12:
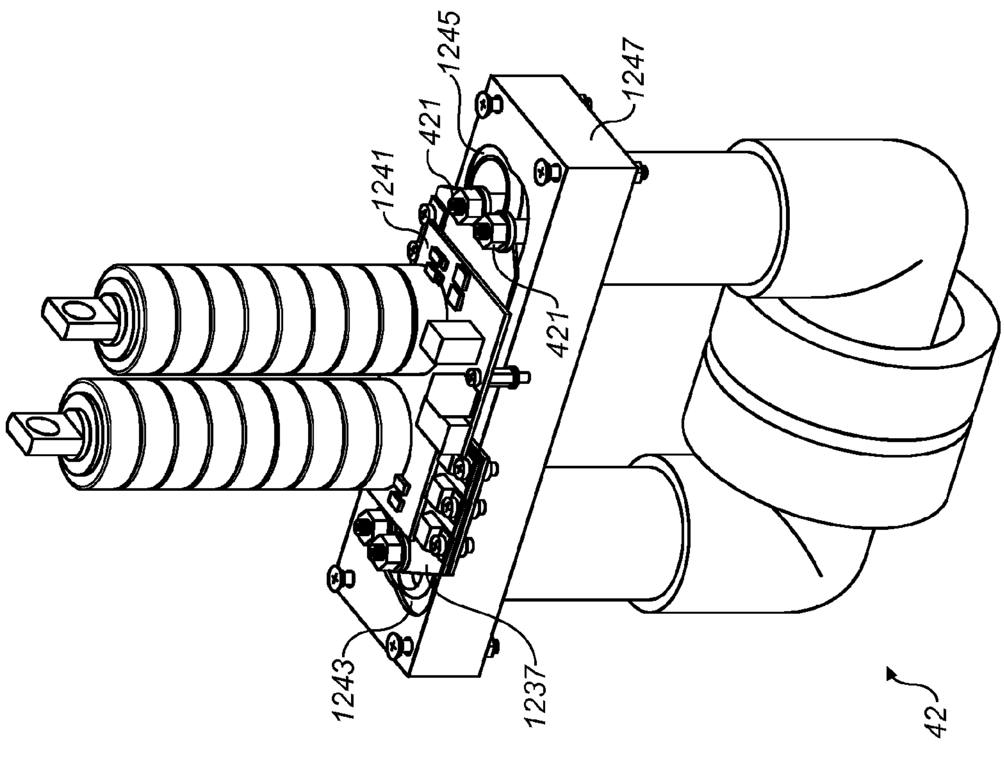
FIG. 12 is a perspective view of the transformer of FIG. 10 with a shielding cover removed.
Figure 13:
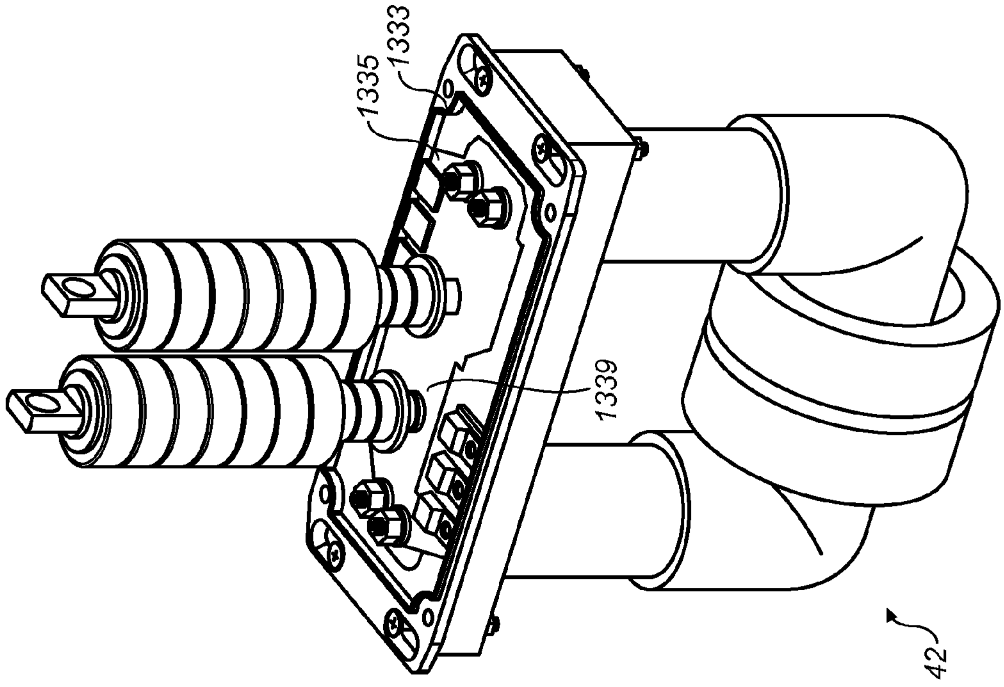
FIG. 13 is a perspective view of the transformer of FIG. 12 with a PCB removed.

A transformer 42 suitable for a DC heating supply is similar to the transformer 12 used for the AC supply. An overall assembly with synchronous rectifiers is shown in perspective in FIG. 10 and a vertical cross-sectional view is shown in FIG. 11. FIG. 12 is a perspective view of the transformer 42 without a screened metal box 109 which in FIGS. 10 and 11 screens the circuitry, including a PCB 1241. FIG. 12 is a perspective view of the amplifier without the screened metal box 109 or the PCB 1241.

A main difference between the transformer 12 for the AC supply and the transformer 42 for the DC supply is that the transformer 42 for the DC supply has two secondary winding tubes 421. If a single winding were used, i.e. N:1 step down, then a bridge rectifier would be required and the current would flow through two rectifiers in series. For high current low voltage applications a push pull secondary is used where each of the secondary windings has a single associated rectifier. This reduces loss as current only flows through a single rectifier. The required transformer now has windings that are N:1:1 step down and the current in each turn is half that of the full current. The two individual secondary windings do not conduct together but conduct on alternate half cycles of the input supply.

The two secondary winding tubes 421 are closely spaced, to maximise coupling between them, as there is a peak voltage of approximately only 3 times Vh between them. The two secondary winding tubes 421 can be of reduced diameter compared with the secondary winding of a transformer for an AC supply, as the current in them is reduced to around 0.7 Ih. Their close proximity and the fact that they are also circular in cross-section ensures that an electric field stress in the outer layer of the mould 117 and 119 and in the epoxy filling 115 is still suitably low.

The overall assembly of the synchronous rectifiers system TR1, TR2 is in the screened metal box 109. First and second smoothing chokes L1 and L2 are made up of two core assemblies 1021 that fit over connection leads 1123, 1125 from the secondary winding to the tube heater and cathode. The core assemblies 1021 comprise grouped toroids of suitable materials, such as powder iron cores, with smaller radius cores 1129 inside, and concentric with, larger radius cores 1127. This arrangement raises the inductance as well as giving a certain degree of rigidity to the structure. Although two cores sizes are shown in FIG. 11 more than two sizes can be used if desired or, if available, a single large core could be used. Concentric clamps 1031 hold each core assembly to the screened metal box 109. The connection leads 1123, 1125 can be solid rods as using DC the full conductor cross-section will be utilised. The core assembles 1021, provided they are a sufficient length to obtain the desired inductance, can be longer if wished to reach to the magnetron terminals. This expedient is most useful in finalising a particular design.

A lid 1333 of the screened metal box 109 forms one of the connections between the transformer (Tfmr1*s*1 and Trfm1*s*2) 42 and the second smoothing choke L2. Connections between TR1*n* drains and Tfmr1*s*1 and TR2*n* drains and Ttfrm1*s*2 respectively are made with flat copper strips 1335, 1237. A further copper strip 1339 makes a connection between L1 and Tr1*n*, Tr2*n* sources and L1. Connections for high current are made on the Tfmr1 secondary tubes 421 in a similar manner to that used for the AC application, with soldered or brazed in fixing bushes, as in FIG. 8, that are tapped with a suitable size thread to ensure a firm fit for the current involved, for example M6 for 120 A.

Control for the synchronous rectifiers TR1, TR2 is mounted on the control PCB 1241 that is mounted above the copper connection strips. Two current monitors $CT_{s1}$ and $CT_{s2}$ 1243, 1245 are mounted around the main tubes that feed sources of Tr1*n* and Tr2*n*. A fixing block 1247 bridging the free ends of the U-shaped secondary windings is used to ensure that the connection between all the elements of the system are held rigidly.

To power the control PCB 1241 a single turn winding 424 is fed through the centre of one of the secondary tubes 421 of Tfmr1. This turn 424 enters and exits the tube at small (1 mm) central drillings in the fixing bushes 1151 on one of the secondary tubes 421.

Although the cathode heater power supply has been described in use with the transformer of FIGS. 10 to 13 it will be understood that the cathode heater supply can be used with other transformers such as, for example, the transformer described in PCT/GB2009/050942. It will be understood that with a 3-phase power supply three transformers may be used, one for each phase.

Power and Resistance Control

Whether AC or DC heating is used, the transformer and rectifier are realised in a way that incurs very little loss. As a consequence it is possible to measure voltage and current at the transformer primary 122, 422 and from these measurements calculate the load power and/or the secondary resistance. These calculations may be implemented by either analogue or digital means.

Figure 3:
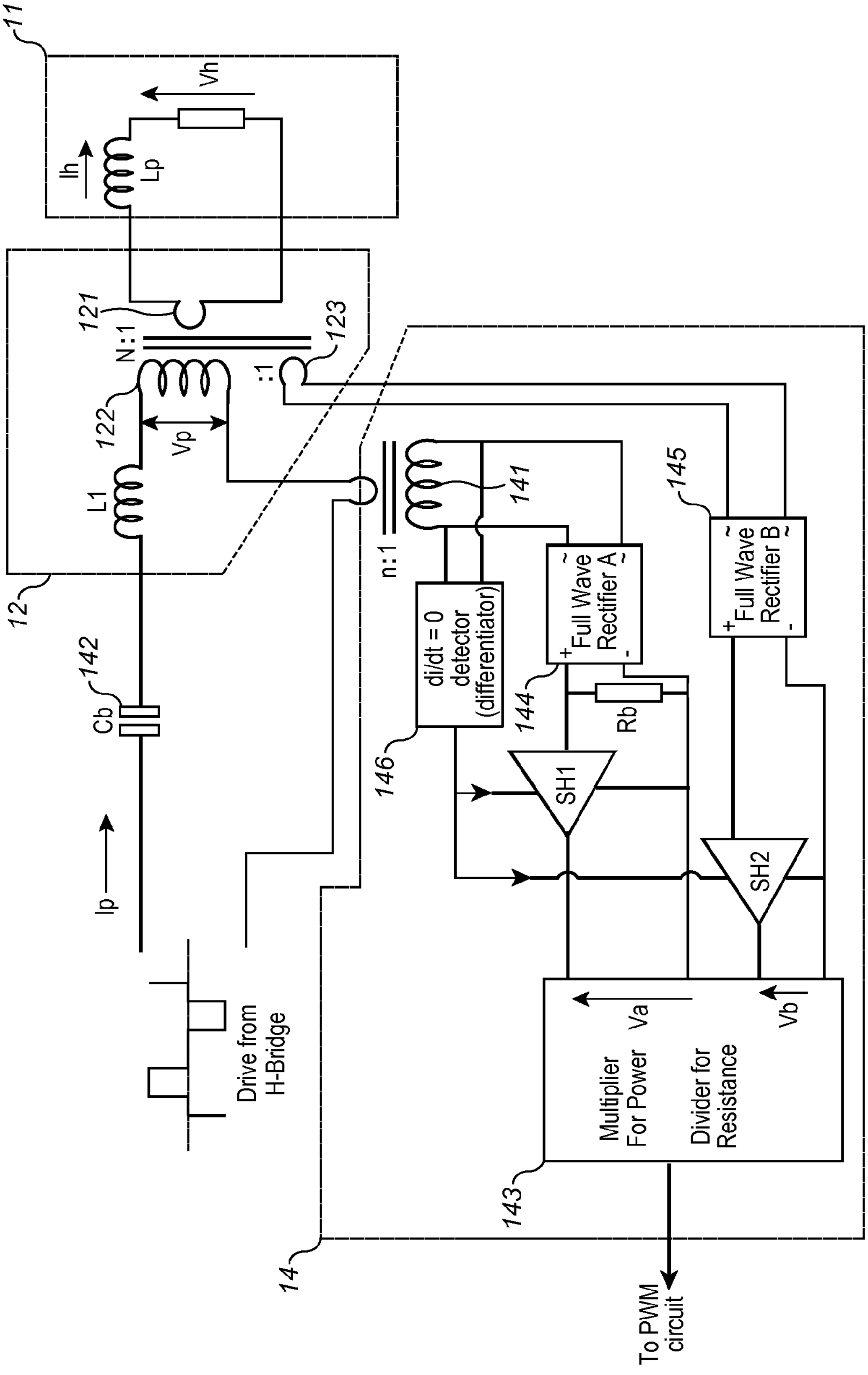
FIG. 3 is a circuit diagram showing in more detail the resistance or power monitoring and control circuits of FIG. 1.

Circuitry for heater power and/or resistance measurement using the AC heater supply of FIG. 1 is shown in greater detail in FIG. 3.

Referring to FIGS. 1 and 3, outputs of the current monitor 141 are connected to inputs of a differentiator 146 and to inputs of a first full wave rectifier 144. Outputs of the monitor winding 123 are connected to inputs of a second full wave rectifier 145. A first output of the first full wave rectifier 144 is connected to an input of a first sample and hold amplifier SH1 and a first output of the second full wave rectifier 145 is connected to an input of a second sample and hold amplifier SH2. An output of the differentiator 146 is connected to respective control inputs of the first and second sample and hold amplifiers SH1, SH2. Second outputs of the first and second full wave rectifiers 144, 145 respectively and of the first and second sample and hold amplifiers SH1, SH2 respectively are connected to four respective inputs of a multiplier/divider module 143. An output of the multiplier/divider module 143 is to a pulse width modulator of the heater supply.

As stated earlier, and as shown in FIG. 2, the primary current Ip through the isolation transformer 12 is of quasi-sine waveform 23. A point on the primary waveform 23 where di/dt=zero is detected by using the differentiator circuit 146. An output of the differentiator circuit enables the two sample and hold amplifiers SH1, SH2 that acquire voltage monitor output from the monitor winding 123 and current monitor output from the current monitor 141 respectively when di/dt=zero. When di/dt is zero the voltage drop in the inductance Ls and Lt will be zero (since inductor voltage=L*di/dt) so current and voltage values will be the values applied to the load Rh of the cathode heater 11 multiplied by the transformer ratio $N^2$.

By using an analogue multiplier chip 143 such as an AD534 a voltage proportional to the power in Rh (i.e. Va*Vb) can be obtained. Conversely, the analogue multiplier chip AD534 143 can be programmed to divide so that a voltage proportional to resistance (i.e. Vb/Va) of the load Rh can be obtained. FIG. 3 shows that each signal Va and Vb is rectified by the first and second full wave rectifiers 144, 145, respectively. By this expedient only +ve numbers are required to be processed by the multiplier and/or divider 143 thus making implementation simpler.

Figure 6:
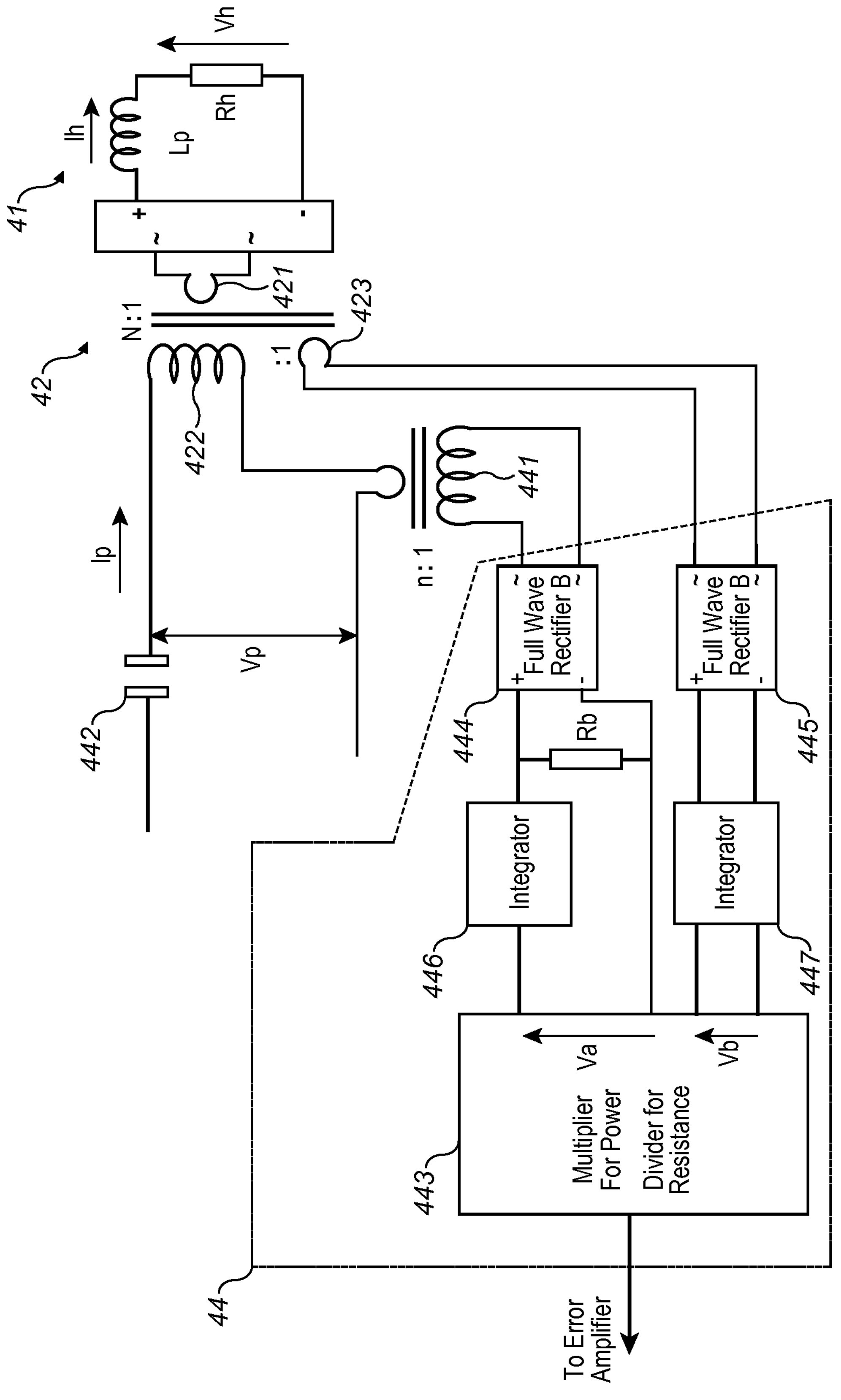
FIG. 6 is a circuit diagram showing in more detail the resistance or power monitoring and control circuits of FIG. 4.

For the DC heater a different method is implemented and the measurement system of FIG. 4 is illustrated in more detail in FIG. 6.

Referring to FIGS. 6 and 4, outputs of the current monitor 441 are connected to inputs of a first full wave rectifier 444. Outputs of the monitor winding 423 are connected to inputs of a second full wave rectifier 445. A first output of the first full wave rectifier 444 is connected to an input of a first integrator 446 and a first and second outputs of the second full wave rectifier 145 are connected to respective inputs of a second integrator 447. An output of the first integrator 446, a second output of the first full wave rectifiers 444 and first and second outputs of the second integrator 447 respectively are connected to four respective inputs of a multiplier/divider module 443. An output of the multiplier/divider module 443 is to the error amplifier 431 shown in FIG. 4.

As has been stated, the transformer 42, rectifier 444, 445, and monitors 441, 423 are very efficient and virtually without loss. Consequently, the only power flow in the equipment is dissipated in the load Rh of the cathode heater 41. Thus by rectifying and smoothing via integrators 446, 447 outputs from the current monitor 441 and single turn voltage monitor 423, the power can be obtained by the product Va *Vb or the resistance by the division Vb/Va.

The main difference between the AC and DC heater systems is that the sample and hold amplifiers SH1 and SH2 of the AC supply circuit need to be reconfigured as integrators 446, 447 in the DC supply circuit.

Digital Controller Implementation

For both AC and DC variants of the heater power supply the parameters that need to be measured are load voltage and load current. The load voltage and current are derived from measurement of primary side parameters as described above. The difference between the AC and DC variants is simply timing of the sampling. A same version of software can be used for both AC and DC versions. A small switch or jumper can be used to indicate to a DSP processor which variant of load is connected. Once the necessary measurements have been digitised the load resistance can be calculated using a method appropriate to a connected load variant. For a DC variant the calculation is simply Rload=Vh/Ih. For an AC version the voltage could be sampled at di/dt=0. The calculation of the resistance is the same as in the DC version.

Dynamic Model of Cathode

Figure 14:
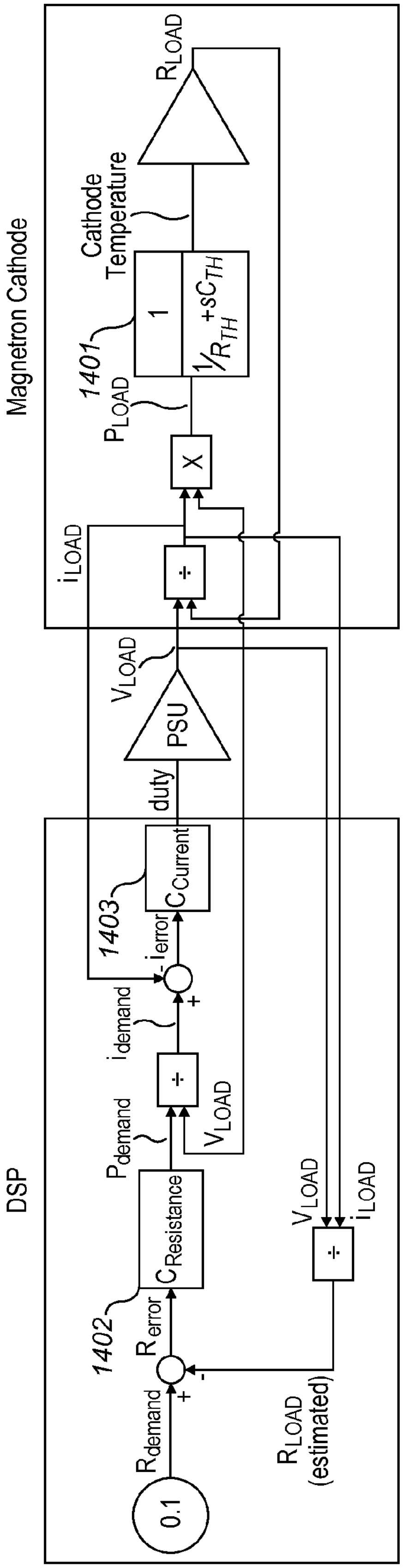
FIG. 14 is a block diagram useful in modelling the heater supply of the invention for providing digital control thereof.

FIG. 14 shows a controller block diagram of the cathode heater resistance controller implemented by DSP software and also a simplified model of the thermal dynamics of the magnetron cathode structure. The model is based on the thermal mass 1401 of the tungsten cathode and a linear approximation of the thermal resistance about the operating point. The Laplace domain dynamic model of the cathode is the basis of the controller design and is used to find the PI controller constants to achieve a required closed loop response. Transducer/measurement gains for $i_{load}$ and $V_{load}$ are not shown because they are cancelled out by the DSP. $\alpha$ is the temperature coefficient of resistance for the tungsten cathode filtering and sampling of $i_{load}$ and $V_{load}$ are also not shown. In the model, the tem $T^4$ is assumed to be linear about the operating point and the thermal coefficient of resistivity $\alpha$ is assumed to be linear about the operating point.

DSP Digital Controller Implementation

The two nested PI controllers 1402, 1403 shown in FIG. 14 are implemented in DSP software. Both controllers have a sample frequency equal to the switching frequency of the inverter. The dynamics of the system are dominated by the thermal time constant of the cathode. Therefore the closed loop bandwidth of the system will be much lower than the controller sample frequency. This means it is possible to design the controllers in the continuous domain and use the bilinear transform to convert the controller constants for digital implementation. The load resistance error signal is passed into the resistance controller $C_{Resistance}$ 1402. The output of the resistance controller 1402 is a power demand $P_{demand}$, from which the demand current is calculated by $i_{demand}=P_{demand}/V_{load}$. The demand current $i_{demand}$ is then used as a demand signal for the second, nested PI control loop 1403 that controls the load current, $C_{Current}$. The output of the current controller 1403 is a duty demand, duty, that feeds a PWM generator for the inverter 13, 43. The control structure is identical for both AC and DC variants. Digital implementation of PI control loops is well understood and not discussed here.

The invention claimed is:

1. A cathode heater supply for a microwave source comprising:

a switched mode power supply (SMPS) inverter;

an isolation transformer comprising:

a primary winding arranged to be powered by the SMPS inverter;

a monitor winding passing through primary core assemblies of the primary winding; and a secondary winding arranged for connection to the cathode heater;

a current monitor arranged to monitor a current in the primary windings; and a signal processor arranged to receive a first input signal from the monitor winding indicative of a voltage across the cathode heater and a second input signal from the current monitor indicative of a current through the cathode heater, the signal processor being arranged to output a control signal to the SMPS inverter to control power supplied to the cathode heater dependent on the first input signal and the second input signal.

2. A cathode heater supply as claimed in claim 1, wherein the signal processor is arranged to determine a monitored resistance of, or monitored power supplied to, the cathode heater.

3. A cathode heater supply as claimed in claim 1, wherein the monitor winding is a single turn winding.

4. A cathode heater supply as claimed in claim 1, wherein the primary winding is a single layer winding.

5. A cathode heater supply as claimed in claim 1, wherein the signal processor comprises:

a monitor and control circuit arranged to receive the first input signal from the monitor winding and the second input signal from the current monitor and to output a comparison signal comprising a division or product of the first input signal and the second input signal; and an error amplifier arranged to receive the comparison signal from the monitor and control circuit and a reference signal from reference voltage supply and to output a control signal to the SMPS inverter dependent on a comparison of the comparison signal and the reference signal to control power supplied by the SMPS inverter to the cathode heater.

6. A cathode heater supply as claimed in claim 1, wherein the power supplied to the cathode heater by SMPS inverter is controlled by controlling a duty cycle of the SMPS inverter.

7. A cathode heater supply as claimed in claim 1, comprising a capacitor connected in series between the SMPS inverter and the primary winding.

8. A cathode heater supply as claimed in claim 7 for supplying AC power to the cathode heater, wherein the capacitor is such that the primary circuit supplying the primary windings is a resonant circuit resulting in a quasi-sine primary current waveform with a detectable stationary point.

9. A cathode heater supply as claimed in claim 8, wherein the secondary winding is a single turn winding.

10. A cathode heater supply as claimed in claim 8, wherein the monitor and control circuit comprises:

a differentiator connected to the current monitor and arranged to determine a stationary point of a waveform of the primary current;

a first full wave rectifier having an input connected to the current monitor and an output to a first sample and hold circuit having an enable input from the differentiator to sample the primary current at the stationary point;

a second full wave rectifier having an input connected to the monitor winding and an output to a second sample and hold circuit having an enable input from the differentiator to sample a primary voltage at the stationary point; and a multiplier/divider module arranged to receive and process signals from the first sample and hold circuit and the second sample and hold circuit and to output a control signal to the SMPS inverter means.

11. A cathode heater supply as claimed in claim 1 for supplying DC power to the cathode heater, further comprising a synchronous rectifier and an inductor arranged to be connected in series between the secondary winding and the cathode heater to be heated and wherein the secondary winding comprises two single turn windings arranged for current to flow alternately therein.

12. A cathode heater supply as claimed in claim 11, wherein the inductor comprises inductive cores encircling connection leads arranged for connecting the secondary winding to the cathode heater to be heated.

13. A cathode heater supply as claimed in claim 11, wherein the signal processor comprises:

a first full wave rectifier having inputs connected to outputs of the current monitor;

a second full wave rectifier having inputs connected to outputs of the monitor winding;

a first integrator having an input connected to a first output of the first full wave rectifier;

a second integrator having respective inputs connected to a first and second outputs of the second full wave rectifier; and a multiplier/divider module having four respective inputs connected to an output of the first integrator, a second output of the first full wave rectifier and first and second outputs of the second integrator respectively, and an output connected to an error amplifier.

14. A cathode heater supply as claimed claim 1, wherein the signal processor is a digital signal processor.

* * * * *